United States Patent [19]

Wiesner et al.

[11] Patent Number: 4,572,588
[45] Date of Patent: Feb. 25, 1986

[54] CONNECTING ELEMENTS FOR CRAWLER TRACK VEHICLE CHAINS PURSUANT TO THE DUALLY-HINGED PIN PRINCIPLE

[75] Inventors: Hagen-Heinz Wiesner, Solingen; Heinz E. Mattern, Remscheid, both of Fed. Rep. of Germany

[73] Assignee: Diehl GmbH & Co., Nuremberg, Fed. Rep. of Germany

[21] Appl. No.: 583,941

[22] Filed: Feb. 27, 1984

[30] Foreign Application Priority Data

Mar. 1, 1983 [DE] Fed. Rep. of Germany ....... 3307107

[51] Int. Cl.⁴ .............................................. B62D 55/21
[52] U.S. Cl. ................... 305/58 PC; 305/59; 305/43; 474/220; 59/5
[58] Field of Search .................. 305/41, 58 PC, 58 R, 305/59, 43, 56, 57, 39; 474/212, 216, 220, 233; 59/5, 7, 78, 84

[56] References Cited

U.S. PATENT DOCUMENTS 403,127  5/1889  McCray ............................. 474/233
3,340,717  9/1967  Körner et al. .................. 305/58 PC

FOREIGN PATENT DOCUMENTS 1480777  7/1969  Fed. Rep. of Germany .
0454176  9/1936  United Kingdom ................ 474/233

Primary Examiner—Robert B. Reeves
Assistant Examiner—Scott H. Werny
Attorney, Agent, or Firm—Scully, Scott, Murphy & Presser

[57] ABSTRACT

Connecting elements for crawler track vehicle chains constructed pursuant to the dually-hinged pin principle, wherein the connector is arranged interiorly of the chain members. The connectors consists of two clamps each having arms which can be inserted offset into each other, and which are fastenable by means of screw connection to the link pins of adjacent chain link members, each clamp encompassing respectively one link pin and form-fittingly fixed thereto, the link pin having a cross-section in at least the region of the connectors deviating from a circular cross-section, and wherein the clamps lockingly interengage in each other.

12 Claims, 5 Drawing Figures

CONNECTING ELEMENTS FOR CRAWLER TRACK VEHICLE CHAINS PURSUANT TO THE DUALLY-HINGED PIN PRINCIPLE

BACKGROUND OF THE INVENTION

1. Field of the Invention

The present invention relates to connecting elements for crawler track vehicle chains constructed pursuant to the dually-hinged pin principle, wherein the connector is arranged interiorly of the chain members.

2. Discussion of the Prior Art

From German Pat. No. 14 80 777 there has become known a crawler track chain for armored vehicles, in which the chain members are coupled to each other through the intermediary of interiorly located connectors. This chain, whose construction is predicated on the dually-hinged pin principle, incorporates link pins or bolts which are fixed in position through locking pins. The articulated connection is hereby effected by means of the connectors alone, wherein dry-bearing type of bushings formed of a suitable material are located intermediate the link pins and the connectors. Consequently, this then relates to a chain with dry-bearing supported link pins. The connectors are each formed of a single piece. This signifies that, during the assembling and disassembling of the chain, for the interconnection of two chain link elements, the connectors must be maintained in alignment with the link pin bores in the chain members so as to be able to press in the link pins. This procedure is time-consuming and relatively cumbersome.

Also known from the disclosure of German OS No. 27 55 412 is a chain which is constructed pursuant to the single-hinged link pin principle, in which the link pins are rubber-supported and two screwable clamps serve to provide for the interconnection of two chain link elements, whereby the clamps are formed from a single piece.

SUMMARY OF THE INVENTION

Accordingly, it is an object of the present invention to provide a simply constructable and inexpensive connector which facilitates a satisfactory form of load transmission from one chain link element to another, and which appreciably reduces the loads on the connecting or link pins during the tensile force transmission, and which allows for the production of a relatively lightweight chain.

The foregoing object is achieved through the intermediary of a crawler track vehicle chain of the type as described hereinabove, in which the connectors consists of two clamps having arms which can be inserted offset into each other, and which are fastenable by means of a screw connection to the link pins of adjacent chain link members, each clamp encompassing repsectively one link pin and form-fitting fixed thereto, the link pin having a cross-section in at least the region of the connectors deviating from a circular cross-section, and wherein the clamps lockingly interengage in each other.

The foregoing construction renders a simple assembling and disassembling possible inasmuch as the clamps are inserted into each other and are screwed together in the running plane of the track chain.

As a consequence of the inventive connector, there are achieved the following advantages through the invention:

The connection of one chain link element to another can be so effectuated along the length of the link pin that on both sides of the connector the pin will still be positioned within the rubberized link pin support, and as a result will not be subjected to loads in the unsatisfactory form as in the previous end connector chains.

The improved distribution of the tensile force which is to be transmitted to the link pins positively leads to smaller diameters. Excessively heavy chain link constructions are thereby avoided.

The loading of the connector through the "turning" of the chains, caused by its position, is less than that in heretofore known end connectors which are maximally loaded through such a load in its external position.

The rear side (drive sprocket wheel side) of the connectors represents at a positive bend, at a straight position and also during a negative bend of the chain links, a type of bridge for the sprocket wheels, and reduces the heretofore always encountered rough running through the gap between the individual tubular link members of a track chain. Even upon a loosening of the threaded connection of the connectors there will not be encountered the danger of the opening of the chain, as would be the case in the end connector track chains.

During travel through wire obstructions, there is practically precluded any suspension and taking along of the wire. This is a serious disadvantage of end connector track chains of previous constructional types.

The invention further provides the following inventive features in that, pursuant to one aspect thereof, there is provided a simple screw connection for the connectors. The screw is subjected to relatively low shearing stresses and, as a result, can be dimensioned smaller than heretofore. Furthermore, in a simple manner, two arms of adjacent clamps can be presently coaxially centered with respect to the screw connection. The manufacture and the bearing support is simplified and, during the assembling of the connectors, any inadvertent exchange or confusion between the clamps is not possible. The drive sprocket wheel side of the connectors is constructed flat, and serves for the additional support of the drive sprocket wheels during their transfer from one chain link to the subsequent chain link. In accordance with another feature of the invention, there is obtained a simple and effective form-fit between the components. Pursuant to another feature, the link pins which are constructed as hollow bushings afford a considerable weight-saving, which allows for the formation of the surfaces corresponding with the connectors in a simple manner through cold deformation. Additionally, the arms of the clamps serve as elements for the screw connection prestressing and increase, although to a minor extent, the link pin encompassing angle through the bending of the arms. Pursuant to another aspect of the invention, the link pins are, along four sides thereof, in surface or line contact. The specific surface pressing against the link pins is thereby relatively low and at a large degree of safety against any undesirable rotation in the connector. Furthermore, there is also ensured an unhindered force transmission between the link pins.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
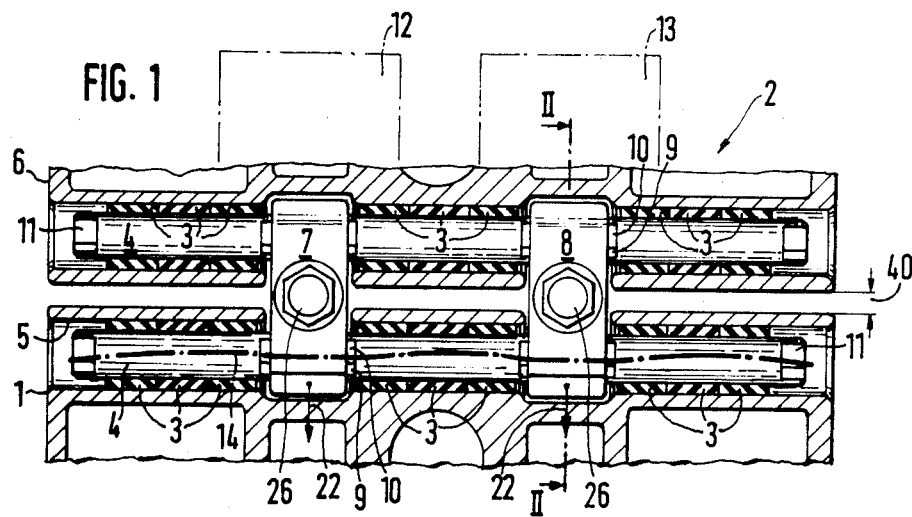
FIG. 1 illustrates a sectional view, taken in direction of the vehicle travel, through a crawler track vehicle chain which is constructed pursuant to the dually-hinged link pin principle.

Referring now to FIG. 1 of the drawings, in the chain link members 1, 6 of a crawler track vehicle chain 2, link pins 4 which are supported in rubber 3 are each pressed into a bore 5. The link pins 4 are provided with flat surfaces 9, 10 in the region of connectors 7, 8. In order to orient the pins 4 with regard to their position relative to the connectors, there are provided surfaces 11 for engagement with a suitable worktool. The connector 7, 8 are mounted on the link pins 4. Drive sprocket roller paths 12, 13 are illustrated in chain-dotted lines. During the presehce of tensile loads within the chain 2, acting in the direction of arrows 22, there is produced the deformation line 14 of the link pin 4 as shown in chain-dotted representation. Hereby, the rubber 3 supports the correspondingly deformed link pin 4 within the bore 5.

Figure 2:
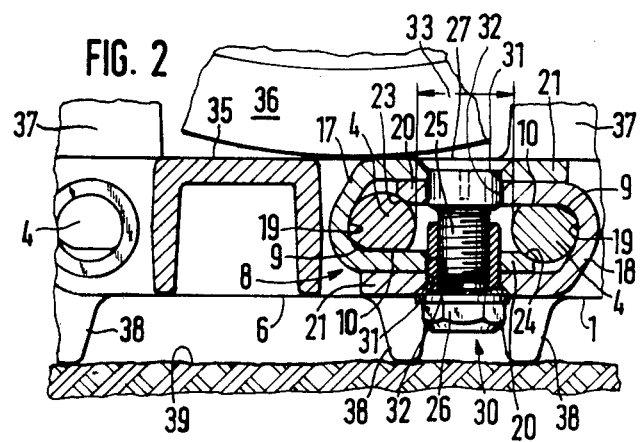
FIG. 2 is a fragmentary cross-sectional view through the crawler track vehicle chain of FIG. 1.

As shown in FIG. 2, the connector 8 consists of two identically constructed clamps 17, 18 which form-fittingly encompass the link pins 4 with the curved sections 19 and the flat arms 20, 21. Through the surfaces 23, 24 they are supported against the link pins 4, and contact against the surfaces 9, 10 of the link pins. The clamps 17, 18 incorporate bores 31 and 32 in conformance with a screw connection 30 constituted of a screw 25 and clamping sleeve 26. The arms 20, 21 bridge over the open area 33 between the link pins 4, or as shown in FIG. 4, link pins 42.

The screw 25 lies in the plane 35 with the arm 21 of the clamp 17, such that a drive sprocket wheel 36 is supported by the clamp 17 during rolling over from one chain link member 6 to another chain link member 1. The chain link members 1 and 6 incorporate guide sprocket teeth 37 and gripper bars 38. The head of the clamping sleeve 26, in the direction towards the path of travel 39, lies within the supporting region of the gripper bars 38.

Figure 3:
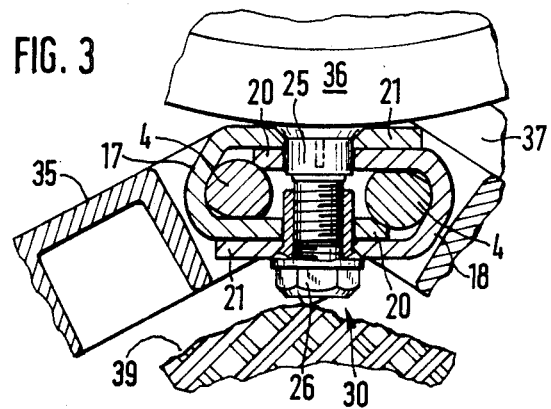
FIG. 3 illustrates the crawler track vehicle chain pursuant to FIG. 2 shown at a negative bend.

The side of the connectors 7, 8 towards the drive sprocket wheels represents at a positive bend, during a straight position (FIG. 2), and also at a negative bend (FIG. 3) of the chain links 1, 6, a type of bridge for the drive sprocket wheel 36, and reduces the rough running through the previously unbridged gap 40 between the individual tubular members 1 and 6 of the crawler track chain 2.

Figure 4:
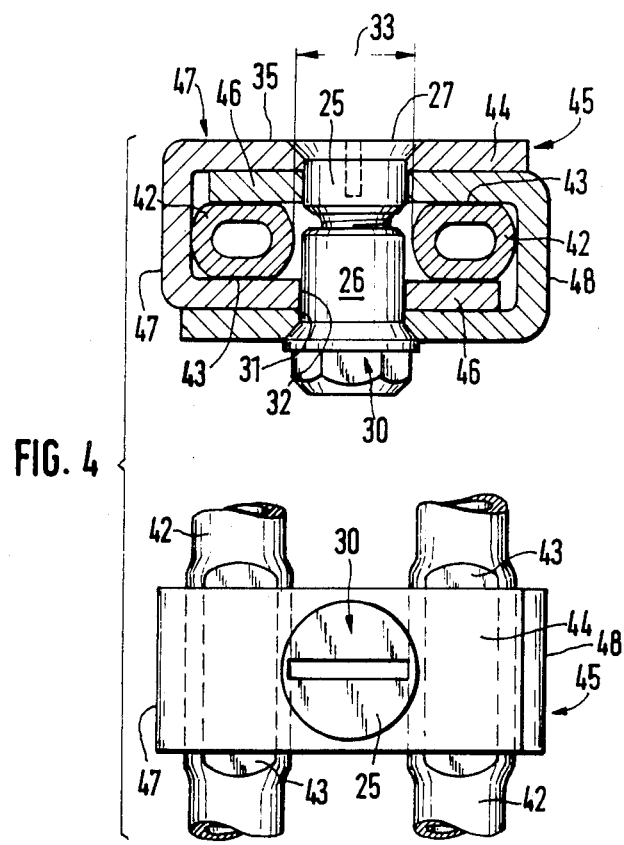
FIG. 4 illustrates respectively two views, one in transverse section and one in plan view, of a connector with link pins.
Figure 5:
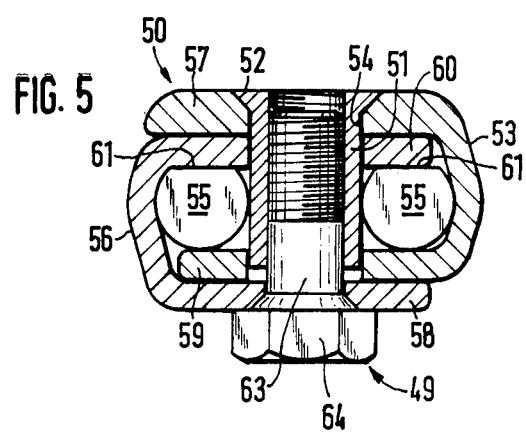
FIG. 5 illustrates a sectional view through a modified embodiment of a connector with link pins.

According to FIG. 4, the pins are formed as hollow bushings 42. In the region of the connector 45, the tubes 42 are provided with flats 43 and conform to the inner arms 46 of the clamps 47 and 48 of the connector 45. The arms 46 completely cover the flats 43. Closely fitted to the surface of the arm 44 is the head 27 of the screw 25. Pursuant to FIG. 5, in a connector 50, a clamping sleeve 51 with a conical head 52 of a screw connection 49, is arranged at the drive sprocket wheel side so as to be recessed in a clamp 53. The clamp 53 is provided with a corresponding bore 54. The clamping sleeve 51 centers the pins 55 and the clamps 53 and 56.

The arm 57 which receives the head 52 is constructed heavier than the remaining arms 58 through 60 of the clamps 53 and 56. The arm 60 lies against the flats 61 on the pins 55, whereas the arm 59 with the link pin 55 provides merely a line contact. The link pins 55 lie against the clamping sleeve 51 and the clamps 53 and 56. A screw 63 with a head 64 connects the clamps 53 and 56 with the pins 55 under prestressing so that, for the remainder, there is provided a form-fit.

The assembling of the connectors 7 and 8, or 45 and 50, on the crawler track vehicle chain is effectuated in that, as described with the example of connector 8, the clamps 17 and 18 are preadjusted on the respective link pins 4 of the chain links 1, 6 in the plane of the chain. Thereafter, the above-mentioned clamps are slid into each other, and positioned and fastened by means of the screw connection 30.

Besides the described screw connection 30 and 49, as well as the configurations of the clamps and the link pins, other modifications can be readily employed which are within the scope of the present invention.

What is claimed is:

1. In connecting elements for interconnecting adjoining chain link members of crawler track vehicle chains including a pair of dually-hinged link pins; including connectors extending between and into recesses in the chain link members; the improvement comprising: each of said connectors including two clamps having arms overlappingly insertable into each other, a screw connection for clampingly fastening said clamps to the link pins of said adjoining chain link members, each said clamp form-fittingly encompassing respectively one said link pin, each said link pins having a cross-section deviating from a circular cross-section in at least the region being grippingly engaged by said clamps.

2. Connecting elements as claimed in claim 1, wherein said screw connection fastening said clamps and said link pins in a form-fitting and load-transmissive manner comprises a screw and clamping sleeve for threadingly receiving said screw, said clamping sleeve and screw extending through apertures formed in the overlapping arms of said clamps, and said clamping sleeve and screw aligning at least two overlapping arms of different clamps relative to each other.

3. Connecting elements as claimed in claim 2, wherein said clamping sleeve and screw align the overlapping arms of different clamps.

4. Connecting elements as claimed in claim 1, wherein said screw connection for form-fittingly and load transmissively connecting said clamps and said link pins comprise a screw and a clamping sleeve threadingly receiving said screw, wherein the clamping sleeve and the screw extend through apertures in two overlapping arms of different clamps to thereby align said clamps relative to each other.

5. Connecting elements as claimed in claim 1, wherein the insertable clamps are constructed similarly shaped.

6. Connecting elements as claimed in claim 2, wherein the clamping sleeve is seated in close surface contact in one arm of said clamp at the side towards a drive sprocket wheel for said chain.

7. Connecting elements as claimed in claim 1, wherein said link pins include flats, at least one arm of said overlapping arms of the clamp contacting said flats.

8. Connecting elements as claimed in claim 1, wherein said link pins comprise hollow bushings having flats thereon conforming to the connection in the area of said connector.

9. Connecting elements as claimed in claim 1, wherein the arms of said clamps bridge an open area between the link pins.

10. Connecting elements as claimed in claim 1, wherein said link pins contact said clamps and the screw connection.

11. Connecting elements as claimed in claim 1, wherein an inwardly located arm of the overlapping arms of said clamp is supported at the ends thereof against an oppositely located link pin.

12. Connecting elements as claimed in claim 2, wherein the screw is seated in close surface contact in one arm of said clamp at the side towards a drive sprocket wheel for said chain.

* * * * *